(12) United States Patent
Covain

(10) Patent No.: US 11,006,272 B2
(45) Date of Patent: May 11, 2021

(54) ELECTRONIC DEVICE FOR GENERATING A CONTROL SIGNAL IN A SECURED FASHION AND METHOD FOR GENERATING SAID CONTROL SIGNAL USING THE ELECTRONIC DEVICE

(71) Applicant: Serge Covain, Campione (IT)

(72) Inventor: Serge Covain, Campione (IT)

( * ) Notice: Subject to any disclaimer, the term of this patent is extended or adjusted under 35 U.S.C. 154(b) by 215 days.

(21) Appl. No.: 16/093,039

(22) PCT Filed: Apr. 25, 2017

(86) PCT No.: PCT/IB2017/052354
§ 371 (c)(1),
(2) Date: Oct. 11, 2018

(87) PCT Pub. No.: WO2017/187326
PCT Pub. Date: Nov. 2, 2017

(65) Prior Publication Data
US 2019/0132731 A1 May 2, 2019

(30) Foreign Application Priority Data
Apr. 28, 2016 (EP) .................................. 16167493

(51) Int. Cl.
*H04W 12/0431* (2021.01)
*H04W 12/02* (2009.01)
(Continued)

(52) U.S. Cl.
CPC ........... *H04W 12/02* (2013.01); *H04L 9/0894* (2013.01); *H04L 9/14* (2013.01); *H04L 12/2803* (2013.01);
(Continued)

(58) Field of Classification Search
CPC ............. H04W 12/003; H04W 12/009; H04W 12/04031; H04W 12/02; H04W 4/80;
(Continued)

(56) References Cited

U.S. PATENT DOCUMENTS 6,658,091 B1 12/2003 Naidoo et al.
9,509,676 B1 * 11/2016 Johnson .................. G06F 21/35
(Continued)

FOREIGN PATENT DOCUMENTS

WO WO-2015/157720 A2 10/2015

OTHER PUBLICATIONS

International Search Report and Written Opinion for PCT/IB2017/052354, dated Jun. 26, 2017, 6 pages.

*Primary Examiner* — David J Pearson
(74) *Attorney, Agent, or Firm* — Blank Rome LLP

(57) ABSTRACT

The present disclosure concerns an electronic device configured for generating a control signal for controlling another device in a secured fashion when receiving a command signal from a mobile device, the electronic device being further configured for generating and storing a set of keys that are used for encrypting the command signal between the electronic device and the mobile device, each key being used only once. The present disclosure further pertains to a method for generating the control signal in a secured fashion in accordance with the command signal using the electronic device.

19 Claims, 3 Drawing Sheets

(51) Int. Cl.

| | |
|---|---|
| *H04L 29/06* | (2006.01) |
| *H04L 12/28* | (2006.01) |
| *H04W 4/02* | (2018.01) |
| *H04L 29/08* | (2006.01) |
| *H04W 12/04* | (2021.01) |
| *H04L 12/46* | (2006.01) |
| *H04W 12/033* | (2021.01) |
| *H04W 12/041* | (2021.01) |
| *H04L 9/08* | (2006.01) |
| *H04L 9/14* | (2006.01) |
| *H04W 4/80* | (2018.01) |

(52) U.S. Cl.
CPC ...... *H04L 12/2818* (2013.01); *H04L 12/4625* (2013.01); *H04L 63/0428* (2013.01); *H04L 63/067* (2013.01); *H04L 63/18* (2013.01); *H04L 67/125* (2013.01); *H04L 69/18* (2013.01); *H04W 4/023* (2013.01); *H04W 12/033* (2021.01); *H04W 12/04* (2013.01); *H04W 12/041* (2021.01); *H04W 12/0431* (2021.01); *H04L 2209/80* (2013.01); *H04W 4/80* (2018.02)

(58) Field of Classification Search
CPC ..... G06F 21/305; G06F 21/43; H04L 9/0819; H04L 9/0863; H04L 63/062; H04L 63/068; H04L 63/18; H04L 9/0894; H04L 9/14; H04L 63/0428; H04L 63/067; H04L 12/2803; H04L 2209/80
See application file for complete search history.

(56) References Cited

U.S. PATENT DOCUMENTS

| | | | |
|---|---|---|---|
| 2008/0271123 A1 | 10/2008 | Ollis et al. | |
| 2011/0047384 A1* | 2/2011 | Jacobs | G06K 9/00221 713/176 |
| 2011/0154460 A1* | 6/2011 | Khare | H04W 12/0608 726/7 |
| 2012/0233675 A1* | 9/2012 | Hird | H04L 63/0838 726/6 |
| 2013/0161394 A1* | 6/2013 | Yi | H04L 9/0844 235/462.1 |
| 2014/0337615 A1* | 11/2014 | Tomkow | H04L 63/0428 713/153 |
| 2015/0280994 A1* | 10/2015 | Kim | H04L 61/6022 709/223 |
| 2016/0036594 A1 | 2/2016 | Conrad et al. | |
| 2016/0234688 A1* | 8/2016 | Masuyama | H04W 12/06 |
| 2016/0294828 A1* | 10/2016 | Zakaria | H04W 4/70 |
| 2017/0033925 A1* | 2/2017 | DeNeut | H04L 9/0869 |
| 2017/0264608 A1* | 9/2017 | Moore | H04W 12/06 |

* cited by examiner

ELECTRONIC DEVICE FOR GENERATING A CONTROL SIGNAL IN A SECURED FASHION AND METHOD FOR GENERATING SAID CONTROL SIGNAL USING THE ELECTRONIC DEVICE

RELATED APPLICATIONS

This application is a national phase of PCT/IB2017/052354, filed on Apr. 25, 2017, which claims the benefit of EP Application No. 16167493.2, filed on Apr. 28, 2016. The entire contents of these applications are hereby incorporated by reference.

FIELD

The present disclosure concerns an electronic device configured for generating a control signal for controlling another device in a secured fashion when sending and receiving a command signal from a mobile device. The present disclosure further pertains to a method for generating the control signal in a secured fashion in accordance with the command signal using the electronic device.

DESCRIPTION OF RELATED ART

Over the past few years, the notion of smart connected objects such as sensors and actuators opened the door to an endless number of applications such as smart grids, connected vehicles, smart cities, or smart healthcare, to mention a very few. To that end, several "architectures" have been proposed, generally consisting of either connecting these devices through multi-protocol gateways or using the Internet Protocol (IP) (e.g., IPv6) end-to-end, in addition to various mixed options.

However, the communications that are used to interface with such connected object are often not overly secure, which increases the risk that an unauthorized user may gain control of the object.

US2016036594 discloses a systems for wireless key management for authentication. Authentication includes transmitting a request to a locking device, transmitting a security challenge to the mobile device, and transmitting a response to the challenge and an encrypted user profile for the locking device. The response includes data generated with an access key that is stored by both the mobile device and the locking device. However, the user profile is encrypted by a server using a secret key that is stored by the server.

The product Okidokeys manufactured by Openways allows for controlling a door lock by using a mobile device such as a smartphone. The signal sent by the smartphone to control the lock is encrypted by using a AES 256 bit encryption. However, the key used for encryption is stored in a remote server.

These solution are thus tributary of the security offered by the server provider. Moreover, the above solutions provide a low degree of security owing to the possibilities of interception, for example by a man-in-the-middle, reproduction, and utilization of the key between the time of emission of the key and the time of utilization of the key.

SUMMARY

The present disclosure concerns an electronic device configured for generating a control signal for controlling another device in a secured fashion when receiving a command signal from a mobile device, the electronic device comprising:

a processing unit configured for generating and storing a set of keys comprising a plurality of encryption keys;

a short range communication link configured to establish a short range communication between the electronic device and the mobile device within a short range area and transmit the set of keys to the mobile device, when the mobile device is within the short range area;

a long range communication link configured to establish a communication between the electronic device and the mobile device when the mobile device is outside the short range area;

said long range communication link being further configured to receive a command signal sent by the mobile device, the command signal being encrypted with one key of the set of keys;

the processing unit being further configured to decrypt said command signal and generate the control signal in accordance with the command signal received; wherein every key of the set of keys is used only once.

In an embodiment, the control signal is configured for controlling an object to be controlled within the short range area, such as for connected objects and home automation applications.

The present disclosure further concerns a method for generating a control signal for controlling another device in a secured fashion in accordance with a command signal using the electronic device, comprising:

establishing a short range communication link between the electronic device and the mobile device when the mobile device is within the short range area;

generating and storing said the set of keys in the processing unit;

transmitting the set of keys to the mobile device across the short range communication link;

receiving the command signal encrypted with one of the keys transferred to the mobile device across the long range communication link and decrypting the command signal with said one of the keys stored in the processing device;

generating the control signal in accordance with the command signal;

wherein every key of the set of keys is used only once.

In an embodiment, the electronic device is configured to function as a smart home control device and the step of generating the control signal comprises controlling a house related device, namely a device heating, ventilation, air conditioning (HVAC), or a door lock.

In another embodiment, the command signal comprises a message and generating the control signal comprises sending the message to be sent to a recipient.

In yet another embodiment, the mobile device comprises a plurality of mobile devices and generating and storing the set of keys in the processing unit comprises generating and storing a plurality of set of keys, a different set of keys being transferred to each of the plurality of mobile devices.

In yet another embodiment, the message received from one of the plurality of mobile devices is decrypted using a key from one of the plurality of set of keys corresponding to said of the plurality of mobile devices; and the message transmitted to another mobile device of the plurality of mobile devices is encrypted using a key from a different set of keys corresponding to said another mobile device. The message can comprise a tag corresponding to the recipient.

In yet another embodiment, the electronic device comprises a mobile device identification device; and the method further comprises an initial mobile device identifying step of identifying each of said plurality of the mobile devices device in the electronic device when each of said plurality of the mobile devices is within the short range area.

In yet another embodiment, the mobile device identification device comprises wired connection; and the registering step is performed by physically connecting each of said plurality of mobile devices to the electronic device across the wired connection.

In yet another embodiment, the mobile device identifying step comprises registering a unique identifying code of each of said plurality of mobile devices in the electronic device.

In yet another embodiment, the electronic device further comprises a user identification device, and the method further comprises a user identifying step comprising registering user characteristics of a user owning the mobile device by using the recognition device.

The user characteristics can be associated with said plurality of set of keys transmitted to the mobile device owned by said user.

The mobile device identifying step can be performed in combination with the user identifying step to allow transmitting said plurality of set of keys to said plurality of mobile devices.

In yet another embodiment, each key of said plurality of set of keys is based on a time-based one-time password algorithm.

Each key of said plurality of set of keys can be based on a time-based one-time password algorithm. The received command signal can be valid for a limited period of time. The period of time can be set to less than one hour, less than 30 min, less than 5 min or less than 30 sec, or a variable time period.

In yet another embodiment, the command signal comprises a plurality of command signal portions; and said receiving a command signal comprises receiving the command signal portions, each command signal portion being encrypted using said one key. The plurality of command signal portions can be received from a plurality of different servers.

In yet another embodiment, the electronic device communicates with said at least a remote server using a XMPP protocol.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS

Figure 1:
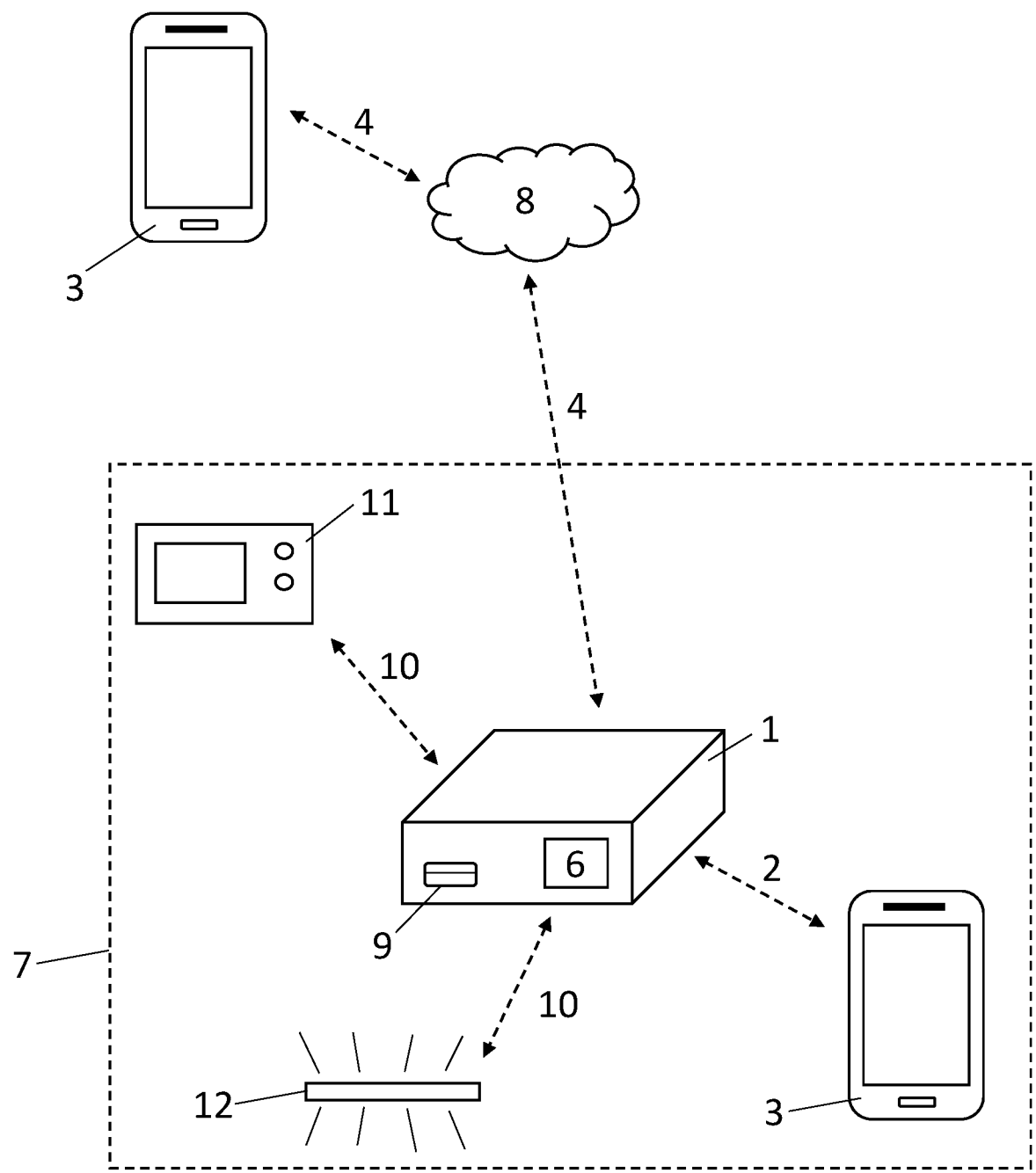
FIG. 1 represents an electronic device according to an embodiment.

FIG. 1 represents schematically an electronic device 1, according to an embodiment. The electronic device 1 is configured for generating a control signal for controlling another device in a secured fashion when receiving a command signal from a mobile. The electronic device 1 comprises a short range communication link 2 configured to establish a short range communication between the electronic device 1 and a mobile device 3 within a short range area 7. The electronic device 1 further comprises a long range communication link 4 configured to establish a long range communication between the electronic device 1 and the first mobile device when the mobile device 3 is remote, i.e., when the mobile device 3 is outside the short range area 7.

In the present disclosure, the expression "short range communication link" means a communication link that is established within a short range area 7 such as a residence, school, laboratory, or office building. An example of such short range communication link is a local area network (LAN), preferably based on wireless technologies (WLAN). The short range communication link 2 does not require a wireless access point. The term "remote" means that the mobile device 3 is outside the range area 7 and that would not be able to communicate across the short range communication link 2 but only across the long range communication link 4. The expression "long range communication link" means that a communication link is established between the electronic device 1 and the mobile device 3, outside the range of the short range area 7. The long range communication link 4 may need an access point such that a communication can be established between the electronic device 1 and the remote mobile device 3. An example of such long range communication link is a wide area network (WAN) such as the Internet.

In FIG. 1, the short range area is represented by the dotted line 7. The short range communication link 2 is configured to establish a communication with the mobile device 3 within the short range area 7. The short range communication link 2 can comprise any wireless local area network based technology. The communication across the short range communication link can be secured by encryption, such as an asymmetrical encryption.

In an embodiment, the electronic device 1 is configured to generate a control signal for controlling an object to be controlled. For example, the electronic device 1 can be used for smart wearable, smart home, smart city, smart environment, and smart enterprise. The electronic device 1 can be used for sensing and/or controlling objects that are within the short range area 7 but also remote objects (outside the short range area 7). The remote objects can be sensed and/or controlled using the long range communication link 4, for example across existing network infrastructure.

Examples of sensing and controlling/actuating objects can include applications that deal with heat, electricity and energy management, home security features and home automation, controlling electrical devices installed in a house, measuring and controlling the water temperature such that the water is warm as soon as one get up in the morning for the shower. Other examples include management of manufacturing equipment, asset and situation management, or manufacturing process control, remote health monitoring and emergency notification systems.

In an embodiment, the electronic device 1 is configured to function as a smart home control device such that the control signal is arranged for controlling a house related device. In the example of FIG. 1, the electronic device 1 is shown in communication with an oven 11 and a lighting system 12. However, the electronic device 1 may be used to control any type of home device such as heating device, a ventilation system, air conditioning (HVAC), a door lock, a TV, a refrigerator, a washer, a dryer, and the like, a fire alarm system, a meter (e.g., an electricity meter, a gas meter and the like), a solar power system, a sprinkler system, a thermostat, or a security system, etc.

The mobile device 3 can be any appropriate mobile device including a smart phone, a tablet computing device, a wearable device (for example, smart glasses or a smart watch), etc.

The control signal for controlling the object to be controlled can be sent across any suitable wired or wireless communication means 10. It can include the same short range communication link 2 or another short range communication means.

The short range communication link 2 and/or the communication means 10, when used within the short range area 7, can include an optical or radio wave communication device, notably using RFID and near-field communication, the Bluetooth® transmission protocol, Bluetooth Low Energy (BLE), a near field communication protocol (NFC), a proximity card or a WiFi direct connection, Zigbee, power line communication, infrared transmission (IR), ultrasound communication, a Z-wave protocol or any other home automation communication protocol.

The long range communication link 4 and/or the communication means 10, when used outside the short range area 7, can comprise any suitable form of wired or wireless telecommunication, including networks, radio, microwave transmission, fiber optics, and communications satellites. The long range communication link 4 can comprise a telephone network or a computer networks using the Internet Protocol.

Alternatively, the short range communication link 2 can comprise a wired connection 9 between the electronic device 1 and the mobile device 3 such as a connection through a USB connector or any other appropriate connector.

The electronic device 1 further comprises a processing unit 6 configured for generating and storing at least a set of keys comprising a plurality of encryption keys. The set of keys can be transmitted to the mobile device 3 through the short range communication link 2 when the mobile device 3 is within the short range area 7.

When the mobile device 3 is outside the short range area 7, i.e., when the mobile device 3 is remote from the electronic device 1, the long range communication link 4 is further configured to receive a command signal sent by the mobile device 3. The command signal can be encrypted with one key of the set of keys, wherein every key of the set of keys is used only once.

The set of keys can comprises any number of keys. For example, the set of keys can comprises 10,000 random passwords randomly generated.

The encrypted command signal can be decrypted when received in the electronic device 1, for example in the processing unit 6. The electronic device 1 then generates a control signal in accordance with the command signal received. For example, the command signal can be destined to control a device and the generated control signal is configured to control the device according to one or more of different protocols, depending on the respective device to be controlled. The controlled device can include an oven 11 or a lighting system 12. The controlled device can further include an oven, a washer, a dryer, a fire alarm system, an electricity meter, a gas meter, a sprinkler system, a thermostat, etc.

According to an embodiment, a method for generating a control signal for controlling another device in a secured fashion in accordance with a command signal received from a mobile device 3, comprises:

establishing a short range communication link 2 between the electronic device 1 and the mobile device 3 when the mobile device 3 is within the short range area 7;

generating and storing the set of keys in the processing unit 6 transmitting the set of keys to the mobile device 3 via the short range communication link 2;

receiving the command signal encrypted with one of the keys transferred to the mobile device and decrypting the command signal with said one of the keys stored in the processing device 6; and generating the control signal in accordance with the command signal.

The same set of keys is stored in the processing unit 6 of the electronic device 1 and in the mobile device 3 and the same key, selected form the set of keys, is used for encrypting the command signal sent by the mobile device 3 and for decrypting the encrypted command signal received by the electronic device 1.

The method further comprises the step of destroying the key used for encrypting and decrypting the command signal.

Thus, when a further command signal is sent by the remote mobile device 3 and received by the electronic device 1, another key from the set of keys is used to encrypt and decrypt this further command signal. Each key of the set of keys can be different from each other such that each command signal received by the electronic device 1 from the remote mobile device 3 will be encrypted with a different key. Each key used for encrypting and decrypting each information received is destroyed after the decryption step.

The set of keys is stored only in the electronic device 1 and in the mobile device 3. The keys used to encrypt and decrypt the information are not accessible on a server or in the cloud and thus to a possible hacker.

The set of keys can be renewed every time the mobile device 3 is within the short range area 7. The set of keys can be renewed automatically when the mobile device 3 is within the short range area 7. To that end, detection means can be used to detect the presence of the mobile device 3 in the short range area 7.

Thus, a new set of keys is transmitted to the mobile device 3 each time the mobile device 3 is within the short range area 7 (in the house, school, laboratory, office building, etc., or wire-connected to the electronic device 1, for example through a USB connector). Each new set of keys comprises a plurality of keys that are different from the keys comprised in the other generated set of keys.

The keys may be codes or passwords generated in a random fashion. Key generation may use a symmetric-key algorithm such as the advanced encryption standard (AES 256) or any other appropriate symmetric-key algorithm. Key generation may also use an asymmetric-key algorithm such as the RSA asymmetric public-private key cryptosystem or any other appropriate asymmetric-key algorithm.

In an embodiment, the keys are generated using a time-based one-time password algorithm (TOTP) algorithm, for example using the standard RFC 6238. A TOPT-generated key combines a secret key (set of keys) with a current timestamp using a cryptographic hash function to generate a one-time password. The timestamp can typically increase in 30-second intervals, so passwords generated close together in time from the same secret key will be equal. When using a TOTP-generated set of keys, the electronic device 1 and the mobile device 3 will need to use the same algorithm at the same time to compute the password.

The TOTP-generated set of keys is secure against a "man-in-the-middle" attack. Indeed, in the case the command signal sent by the mobile device 3 is intercepted by a man-in-the-middle, the electronic device 1 will never receive the command signal and will thus not generate a control signal. The man-in-the-middle can send the intercepted command signal at a later time such that the electronic device 1 will generate the control signal at that delayed time. For example, if the command signal is destined for the electronic device 1 to generate a control signal for opening a home door, the man-in-the-middle can use the intercepted command signal to open the door at a suitable delayed time (when nobody else is at home). However, when using the TOTP-generated set of keys, the electronic device 1 will not be able to generate any control signal since the password will have expired at the delayed time, unless the intercepted command signal is sent within a short delayed time when the person to whom the door opening command signal was destined is still standing before the door.

The password can be valid for a limited period of time that can be set to less than one hour, less than 30 min, less than 5 min or less than 30 sec, a variable time period or any suitable time period.

In another embodiment, the command signal sent by the remote mobile device 3 and received by the electronic device 1 is split in a plurality of command signal portions. Each command signal portion is encrypted using one of the keys.

In an embodiment, the long range communication link 4 is performed through one or a plurality of remote servers via an Internet protocol (see FIG. 1). In a preferred variant, the long range communication link 4 is performed using an extensible messaging and presence protocol (XMPP) protocol. However, other protocol could also be used such as the protocol web real-time communication (WebRTC).

In an embodiment, the command signal comprises a plurality of command signal portions, each command signal portion being sent separately through the long range communication link 4 and received separately in the electronic device 1. Each command signal portion can be encrypted using one of the key of the set of keys.

Each command signal portion can be sent by (and thus received from) a different servers. In that case, each command signal portion can have a different identifying code, for example taking the form of an e-mail address (such as "identifying-code@server-name.xxx") that corresponds to a registration code to each of the servers. In the case one of the servers is not working, another working server can be used for sending the command signal portion.

More particularly, when the mobile device 3 is within the short range area 7, the processing unit 6 can generate a plurality of clients (for example XMPP clients) on a plurality of servers (for example XMPP servers) and can generate randomly a plurality of identifying codes (in addition to generating a new set of keys). The plurality of clients is selected randomly from a list of available clients. The selected clients are preferably secured by SSL/TLS. The electronic device 1 then stores the plurality of identifying codes (and the newly generated set of keys) and transmits to the proximal mobile device 3 the plurality of identifying codes (along with the newly generated set of keys).

The next time the mobile device 3 is within the short range area 7, the previously generated plurality of clients and plurality of identifying codes are destroyed and the processing unit 6 generate a new set of plurality of clients and a new set of plurality of identifying codes (along with a new set of keys). Thus, the selected clients and the generated identifying codes have a limited time span.

Since the identifying codes (and the keys) are transferred from the electronic device 1 to the mobile device 3 across the short range communication link 2 and do not transit through any server. Thus, the identifying codes (and the keys) are only known to the electronic device 1 and the mobile device 3 and the risk of intercepting any of the identifying codes (and keys) by a third party is strongly reduced.

In an embodiment, the electronic device comprises a mobile device identification device. The mobile device identification device can be used in an initial step of identifying the mobile device 3 when the mobile device 3 is within the short range area 7. The initial step of identifying the mobile device 3 can be performed by a wired connection of the mobile device 3 to the electronic device 1, for example across a physical connector such as an USB connector 9 or any other appropriate connector.

The mobile device 3 can be identified by registering a unique identifying code representative of the hardware of the mobile device 3, such as the International mobile station equipment identity (IMEI). In the case the mobile device has a subscriber identification module (SIM) integrated circuit chip, the SIM serial number can be registered as unique identifying code. Alternatively, the media access control address (MAC address) can be registered as unique identifying code.

Registering the unique identifying code can be used for insuring that the transmitted set of keys can only be used in combination with the specific mobile device 3 that corresponds to the unique identifying code. The set of keys can thus not be executed on any other mobile device.

Figure 2:
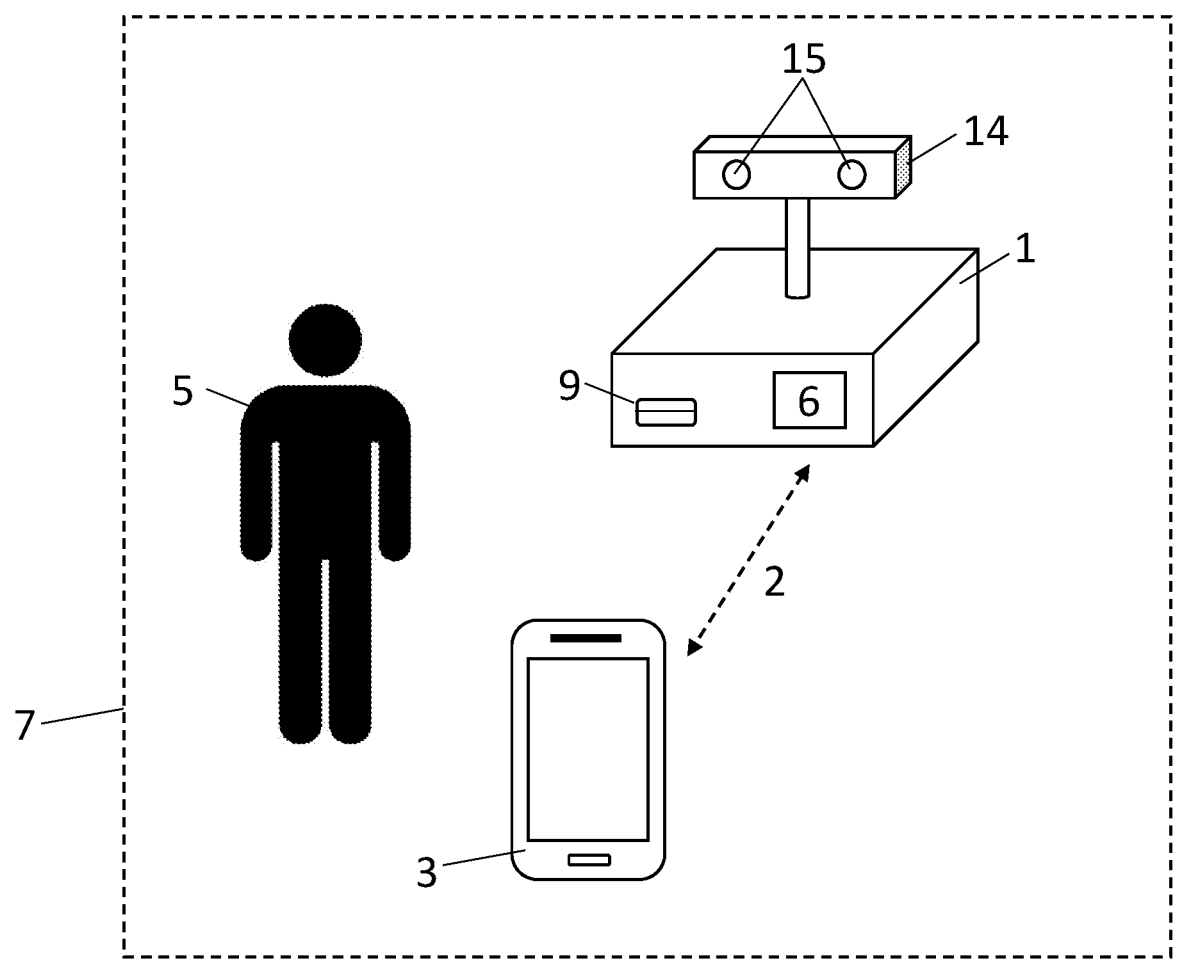
FIG. 2 shows the electronic device, according to another embodiment.

In another embodiment shown in FIG. 2, the electronic device 1 comprises a user identification device 14. The method then comprises a user identifying step wherein the characteristics of a user 5 owning the mobile device 3 are registered in the electronic device 1 when the user and the mobile device 3 are within the short range area 7. The method can comprise a step of pairing the mobile device 3 identified in the electronic device 1 and its owner also identified in the electronic device 1 during the user identifying step.

The user identification device can comprise a facial recognition device 14. The facial recognition system can be a two-dimensional face recognition system, but is preferably a three-dimensional face recognition system. Such three-dimensional face recognition system can advantageously comprises at least two video cameras 15 and/or a 3D sensor (not shown).

Alternatively, the recognition device can comprise a thermal infrared (IR) imagery device. In that case, the cameras 15 can be infrared cameras. Face recognition by using the thermal IR imagery device can be fused with face recognition by using a visible imagery device. In another alternative, the recognition device can comprise a biometric measurement device (not shown).

The registered user 5 characteristics can be associated with the set of keys transmitted to the mobile device 3 owned by the user 5. The mobile device identifying step can be performed in combination with the user identifying step such as to allow transmitting the set of keys to the mobile device 3.

The user identifying step can be used to allow the transmitting of the set of keys to the mobile device 3 across the short range communication link 2. When the mobile device identifying step is performed in combination with the user identifying step, the transmission of the set of keys occurs only when the registered user 5 and mobile device 3 are simultaneously within the short range area 7. The set of keys can be transferred from the electronic device 1 to the mobile device 3 only when the mobile device 3 has been identified in the electronic device 1, for example by registering a unique identifying code of the mobile device 3, and the user owning the mobile device 3 have been identified in the electronic device 1 by the recognition device.

In another embodiment, the electronic device 1 comprises a sensor device 16 configured to detect a feature within the short range area 7. Examples of such sensor device can include a movement/presence detector, a smoke detector, a gas (or any other chemical substance) detector or a video surveillance system. The electronic device 1 is further configured for sending a signal to the mobile device 3, across the long range communication link 4. The signal can be used in the mobile device 3 to alert the owner of the mobile device 3 about the feature detected by the sensor device (occurrence of an intruder, a fire, etc.). The signal sent can be encrypted with one of the key of the set of keys in the electronic device 1 and decrypted with the corresponding key in the mobile device 3, as described above. The key used for encrypting and decrypting is used only once and is destroyed afterward.

Figure 3:
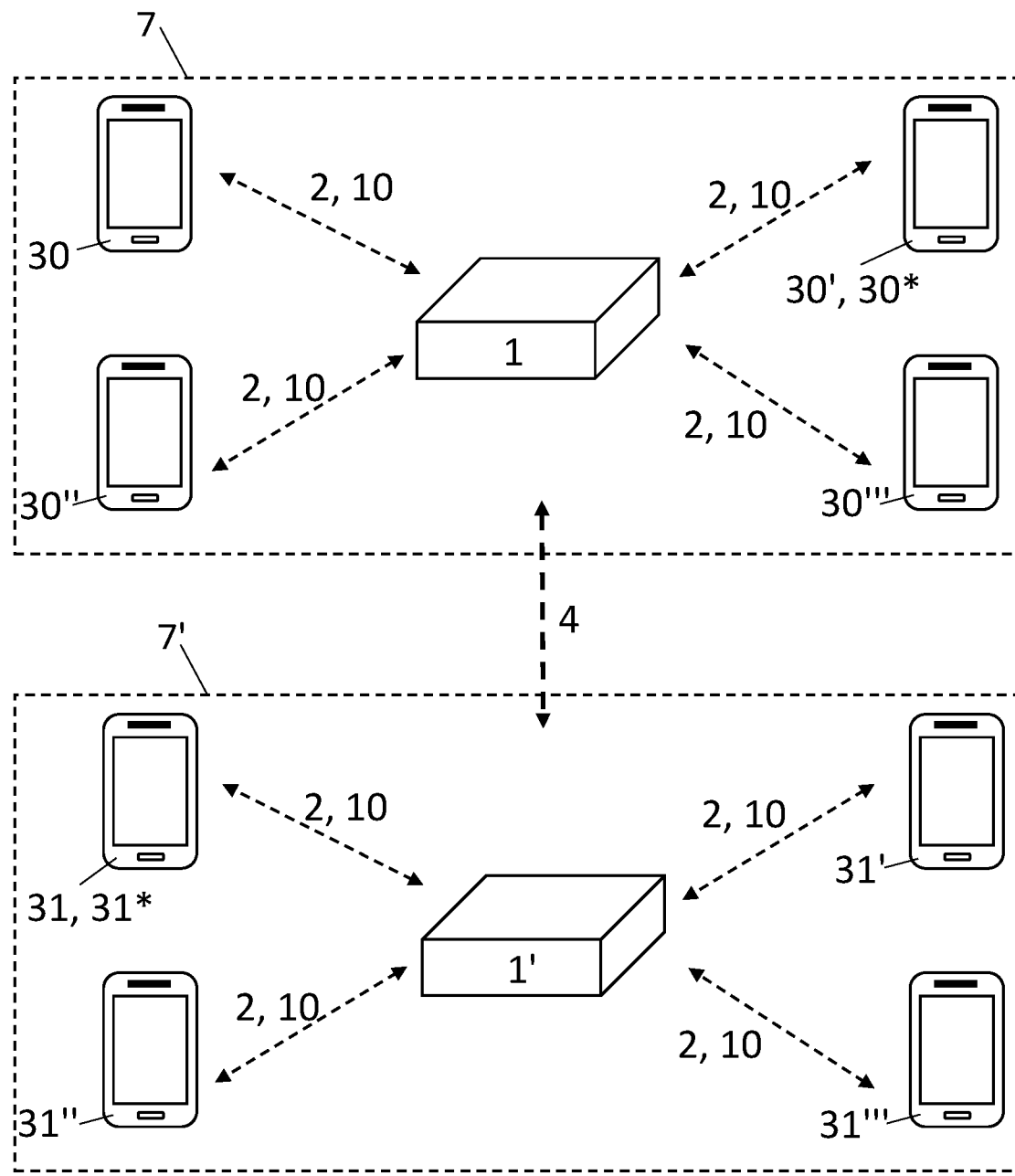
FIG. 3 illustrates a plurality of the electronic device used as a private messaging device, according to an embodiment.

In yet another embodiment illustrated in FIG. 3, the electronic device 1 is used as a private messaging device. In this embodiment, the command signal comprises a message and the control signal generated by the electronic device 1 also comprises a message. Here, the term "message" can comprise any form of information such as text, image, video, sound and any combination of these information.

FIG. 3 illustrates an example of such private messaging device using the electronic device 1. The private messaging device comprises a first electronic device 1 of the invention and a plurality of first mobile devices 30, 30', 30", 30'".

Each of the first mobile devices 30-30'" are destined to come within the short range area 7 of the first electronic device 1 such that a first set of keys is transferred to each of them across the short range communication link 2. The first set of keys transferred to each of the first mobile devices 30-30'" can be different from each other. The mobile device identifying step can further be performed for each of the mobile devices 30-30'" such that a unique identifying code representative of the hardware of each of the first mobile devices 30-30" is registered in the first electronic device 1 and such that the first set of keys is validly transferred only for the corresponding registered first mobile device 30-30'". The mobile device identifying step can be further performed in combination with the user identifying step, such that the first set of keys is validly transferred only for the corresponding registered first mobile device 30-30'" and when the respective user is simultaneously within the short range area 7.

In this configuration, the first electronic device 1 can receive an command signal (message) sent from one of the first mobile device 30-30'" (sender) when within or outside the short range area 7, across the communication means 10. The message will by encrypted with one key of the first set of keys that was transmitted on the sending first mobile device 30-30'" the last time it was proximal to the first electronic device 1.

When the first electronic device 1 receive the encrypted message, the first electronic device 1 decrypts the message, decodes the intended recipient, then the first electronic device 1 encrypts the message and sends the message to the recipient, i.e., the one of the first mobile device 30-30'" to which the message is destined, across the communication means 10.

The received message decrypted in the electronic device 1 can comprise a tag that that indicates that the information received is a command (for example in the case of the internet of the smart house application) or if it is a message (in the present case). In the case the information is a message, the tag can further be used to identify the recipient. For example, the first characters of the encrypted message be used for the tag.

The first electronic device 1 can further generate a list of users for which the unique identifying code of their mobile device 30-30'" and/or the characteristics of the user 5 have been registered in the first electronic device 1. The first electronic will then verify if the unique identifying code and/or characteristics of the user 5 have been registered and send the message to the recipient only if the unique identifying code and/or characteristics of the user 5 are in the generated list.

The message can be an instant message such that the electronic device 1 is used as an instant private messaging device.

Preferably, the message can be viewed for a user-specified length of time before it becomes inaccessible (for example when the message is destroyed). Such specified length of time can be set for example to 1 to 30 sec, 5 min, 30 min, or any suitable time period.

When the message sent by the first electronic device 1 reaches the recipient, the first electronic device 1 can receive an acknowledge message sent by the mobile device 30-30'" being the recipient. In the case the recipient does not received the acknowledge message, for example the recipient mobile device 30-30'" was not active (the mobile device 30-30'" is turned off), the first electronic device 1 can send a time-out message to the sender.

The private messaging device can further include a plurality of electronic devices 1, each cooperating with a plurality of mobile devices 3 such that messages can be transmitted not only between the mobile devices 3 cooperating with one of the electronic devices 1 but also the ones cooperating with other electronic devices 1, as will be exemplified below.

In FIG. 3, the private messaging device comprises a second electronic device 1' of the invention and a plurality of second mobile devices 31, 31', 31", 31'". For example, the first electronic device 1 can be within a first short range area 7, such as a first house or first office building, and the second electronic device 1' can be in a second short range area 7', such as a second house or second office building.

The second electronic device 1' can be used as a private messaging device in combination with the plurality of second mobile devices 31-31'" as described above for the first electronic device 1 and the first mobile devices 30-30'".

In an embodiment, at least one of the second mobile devices 31-31'" can be brought within the first short range area 7 and the mobile device identifying step can be performed for the second mobile device 31-31'" within the first short range area 7 such as to register its unique identifying code in the first electronic device 1. Let's call this second mobile device 31-31'" a guest device 31* (FIG. 3 shows an example of one of the second mobile device 31-31'" being used as the guest device 31*).

The mobile device identifying step can be further performed in combination with the user identifying step for the user owning the guest device 31* for which a unique identifying code has been registered in the first electronic device 1.

When the guest device 31* registered in the first electronic device 1 is within the first short range area 7, the first electronic device 1 transmits to it a first set of keys.

When the guest device 31* is within the second range area 7', the second electronic device 1' transmits to it a second set of keys (the second mobile device 31-31'" is also registered in the second electronic device 1'). Moreover, the second electronic device 1' received the first set of keys from the guest device 31*.

In an exemplary embodiment, a message is sent by one of the second mobile devices 31-31''' (not necessarily the guest device 31*) to a recipient that is one of the first mobile devices 30-30''' (let's call the latter a recipient device 30*). In that case, the second electronic device 1' receives a message sent by one of the second mobile devices 31-31''' (that is not necessarily the guest device 31*).

The second electronic device 1' decrypts the received message using one key from the second set of keys and encrypt the received message using one key from the first set of keys. The second electronic device 1' the send the encrypted message to the first electronic device 1, for example across the long range communication link 4. The first electronic device 1 receives the message and decrypts it using the same one key from the first set of keys. Then, the first electronic device 1 encrypts the message with another key from the first set of keys and sent it to the recipient device 30*. The key used for encrypting and decrypting are destroyed.

It is thus possible to send a message via the electronic devices 1. 1' between one of the mobile devices registered in one of the electronic devices 1, 1' and another mobile device registered in an other electronic devices 1, 1', even when the mobile device that is registered on both electronic devices 1. 1' is not in function (for example, is off). Indeed the two electronic devices 1, 1' can be connected to an Internet network.

In an embodiment, there is a computer carrier comprising program code portions to be executed by the electronic device 1 according to any one of claims 1 to 10 in order to carry out the method of disclosed herein when said program is executed by said electronic device 1.

The computer carrier can further comprises a program code portions to be executed by the mobile device 3 in order to carry out the method when said program is executed by said electronic device 1 and mobile device 3.

In yet another embodiment, any one of the first mobile devices 30-30''' can send a message to any one of the second mobile devices 31-31''' across the long range communication link 4. The message sent by one of the first mobile devices 30-30''' is encrypted with one key of the first set of keys. When received by one of the second mobile devices 31-31''', the message is decrypted using one key of the second set of keys. Each key used for encrypting and decrypting each message is destroyed after the decryption step.

REFERENCE NUMBERS AND SYMBOLS 1 electronic device, first electronic device
1' second electronic device
2 short range communication link
3 mobile device
4 long range communication link
5 user, owner of the mobile device
6 processing unit
7 short range area, first short range area
7' second short range area
8 Internet
9 wired connection
10 communication means
11 oven
12 lighting system
14 facial recognition system
15 camera
16 sensor device
30, 30', 30'', 30''' first mobile devices
30* recipient device
31, 31', 31'', 31''' second mobile devices
31* guest device

The invention claimed is:

1. An electronic device configured for generating a control signal for controlling another device in a secured fashion when receiving a command signal from a mobile device, the electronic device comprising:
   a processor configured for generating and storing a set of keys comprising a plurality of encryption keys;
   a short range communication link configured to establish a short range communication between the electronic device and the mobile device within a short range area and transmit the set of keys to the mobile device, when the mobile device is within the short range area;
   a long range communication link configured to establish a communication between the electronic device and the mobile device when the mobile device is outside the short range area;
   said long range communication link being further configured to receive a command signal sent by the mobile device, the command signal being encrypted with one key of the set of keys;
   the processor being further configured to decrypt said command signal and generate the control signal in accordance with the command signal received; wherein every key of the set of keys is used only once;
   wherein the electronic device further comprises a mobile device identification device configured for identifying the mobile device when the latter is within the short range area; and a user identification device configured for registering the characteristics of a user owning the mobile device when the user is within the short range area; so that the transmission of the set of keys occurs only when the registered user and mobile device are simultaneously within the short range area;
   wherein the registered user characteristics are associated with the set of keys transmitted to the mobile device owned by the user;
   the set of keys being configured to be renewed automatically when the mobile device is within the short range area such that a new set of keys is transmitted to the mobile device each time the mobile device is within the short range area.

2. The electronic device according to claim 1, wherein the control signal is configured for controlling an object to be controlled within the short range area.

3. The electronic device according to claim 1, configured to function as a private messaging device wherein the command signal comprises a message and the generated control signal comprises the message to be sent to a recipient.

4. The electronic device according to claim 1, wherein said short range communication link comprises an optical or radio wave communication device, using MID and near-field communication, a near field communication protocol (NFC), a proximity card, power line communication, infrared transmission (IR), short range radio wave communication, or ultrasound communication.

5. The electronic device according to claim 1, wherein the user identification device is a thermal infrared imagery device and/or a visible imagery device.

6. A method for generating a control signal for controlling another device in a secured fashion in accordance with a command signal received from a mobile device using an electronic device comprising: a processor configured for generating and storing a set of keys comprising a plurality of encryption keys; a short range communication link configured to establish a short range communication between the electronic device and the mobile device within a short range area and transmit the set of keys to the mobile device, when the mobile device is within the short range area; a long range communication link configured to establish a communication between the electronic device and the mobile device when the mobile device is outside the short range area; said long range communication link being further configured to receive a command signal sent by the mobile device, the command signal being encrypted with one key of the set of keys; the processor being further configured to decrypt said command signal and generate the control signal in accordance with the command signal received; wherein every key of the set of keys is used only once;

the method comprising:
  establishing a short range communication link between the electronic device and the mobile device when the mobile device is within the short range area;
  generating and storing the set of keys in the processor;
  transmitting the set of keys to the mobile device across the short range communication link;
  receiving a command signal from the mobile device, the command signal being encrypted with one of the keys transferred to the mobile device across the long range communication link and decrypting the command signal with said one of the keys stored in the processor;
  generating the control signal in accordance with the command signal;
  wherein every key of the set of keys is used only once;
  wherein the method further comprises the steps of, identifying the mobile device when the latter is within the short range area using the mobile device identification device; and
  registering the characteristics of a user owning the mobile device using a user identification device;
  so that the transmission of the set of keys occurs only when the registered user and mobile device are simultaneously within the short range area;
  wherein the registered user characteristics are associated with the set of keys transmitted to the mobile device owned by the user;
  the set of keys being renewed automatically when the mobile device is within the short range area such that a new set of keys is transmitted to the mobile device each time the mobile device is within the short range area.

7. The method according to claim 6,
further comprising a step of destroying the key used for encrypting and decrypting the command signal.

8. The method according to claim 6,
wherein the step of generating the control signal comprises controlling an object to be controlled within the short range area.

9. The method according to claim 6,
wherein the command signal comprises a message and wherein generating the control signal comprises sending the message to a recipient.

10. The method according to claim 6,
wherein the mobile device comprises a plurality of mobile devices; and wherein generating and storing the set of keys in the processor comprises generating and storing a plurality of set of keys, a different set of keys being transferred to each of the plurality of mobile devices.

11. The method according to claim 6,
wherein the electronic device comprises a mobile device identification device; and
wherein the method further comprises an initial mobile device identifying step of identifying the mobile device in the electronic device when the mobile device is within the short range area.

12. The method according to claim 6,
wherein each key of said plurality of set of keys is based on a time-based one-time password algorithm.

13. The method according to claim 6,
wherein the received command signal is valid for a limited period of time.

14. The method according to claim 6,
wherein said command signal comprises a plurality of command signal portions; and
wherein said receiving a command signal comprises receiving the command signal portions, each command signal portion being encrypted using said one key.

15. The method according to any one of claim 6, wherein the long range communication link is performed through one or a plurality of remote servers via an Internet protocol; and wherein the method further comprises generating a plurality of clients on said one or a plurality of remote servers, when the mobile device is within the short range area.

16. The method according to claim 15, further comprising: generating randomly a plurality of identifying codes on said one or a plurality of remote servers; storing said plurality of identifying codes in the electronic device; and transmitting stored plurality of identifying codes to the proximal mobile device within the short range area.

17. The method according to claim 16, further comprising, the next time the mobile device is within the short range area, destroying the transmitted plurality of identifying codes and generate a new set of plurality of clients and a new set of plurality of identifying codes.

18. An electronic device configured for generating a control signal for controlling another device in a secured fashion when receiving a command signal from a mobile device, the electronic device comprising:
  a processor configured for generating and storing a set of keys comprising a plurality of encryption keys;
  a short range communication link configured to establish a short range communication between the electronic device and the mobile device within a short range area and transmit the set of keys to the mobile device, when the mobile device is within the short range area;
  a long range communication link configured to establish a communication between the electronic device and the mobile device when the mobile device is outside the short range area;
  said long range communication link being further configured to receive a command signal sent by the mobile device, the command signal being encrypted with one key of the set of keys;
  the processor being further configured to decrypt said command signal and generate the control signal in accordance with the command signal received; wherein every key of the set of keys is used only once;
  wherein the electronic device further comprises a mobile device identification device configured for identifying the mobile device when the latter is within the short range area; and a user identification device configured for registering the characteristics of a user owning the mobile device when the user is within the short range area; so that the transmission of the set of keys occurs only when the registered user and mobile device are simultaneously within the short range area;

wherein said long range communication link is configured to be performed through one or a plurality of remote servers via an Internet protocol, and the processor is configured to generate a plurality of clients on said one or a plurality of remote servers when the mobile device is within the short range area.

19. A method for generating a control signal for controlling another device in a secured fashion in accordance with a command signal received from a mobile device using an electronic device comprising: a processor configured for generating and storing a set of keys comprising a plurality of encryption keys; a short range communication link configured to establish a short range communication between the electronic device and the mobile device within a short range area and transmit the set of keys to the mobile device, when the mobile device is within the short range area; a long range communication link configured to establish a communication between the electronic device and the mobile device when the mobile device is outside the short range area; said long range communication link being further configured to receive a command signal sent by the mobile device, the command signal being encrypted with one key of the set of keys; the processor being further configured to decrypt said command signal and generate the control signal in accordance with the command signal received; wherein every key of the set of keys is used only once;

the method comprising:

establishing a short range communication link between the electronic device and the mobile device when the mobile device is within the short range area;

generating and storing the set of keys in the processor;

transmitting the set of keys to the mobile device across the short range communication link;

receiving a command signal from the mobile device, the command signal being encrypted with one of the keys transferred to the mobile device across the long range communication link and decrypting the command signal with said one of the keys stored in the processor;

generating the control signal in accordance with the command signal;

wherein every key of the set of keys is used only once;

wherein the method further comprises the steps of, identifying the mobile device when the latter is within the short range area using the mobile device identification device; and registering the characteristics of a user owning the mobile device using a user identification device;

so that the transmission of the set of keys occurs only when the registered user and mobile device are simultaneously within the short range area;

wherein the long range communication link is performed through one or a plurality of remote servers via an Internet protocol; and wherein the method further comprises generating a plurality of clients on said one or a plurality of remote servers, when the mobile device is within the short range area.

* * * * *